July 30, 1929.  J. B. DAVIS  1,722,694
LIQUID DISPENSING APPARATUS
Filed July 14, 1927  2 Sheets-Sheet 1
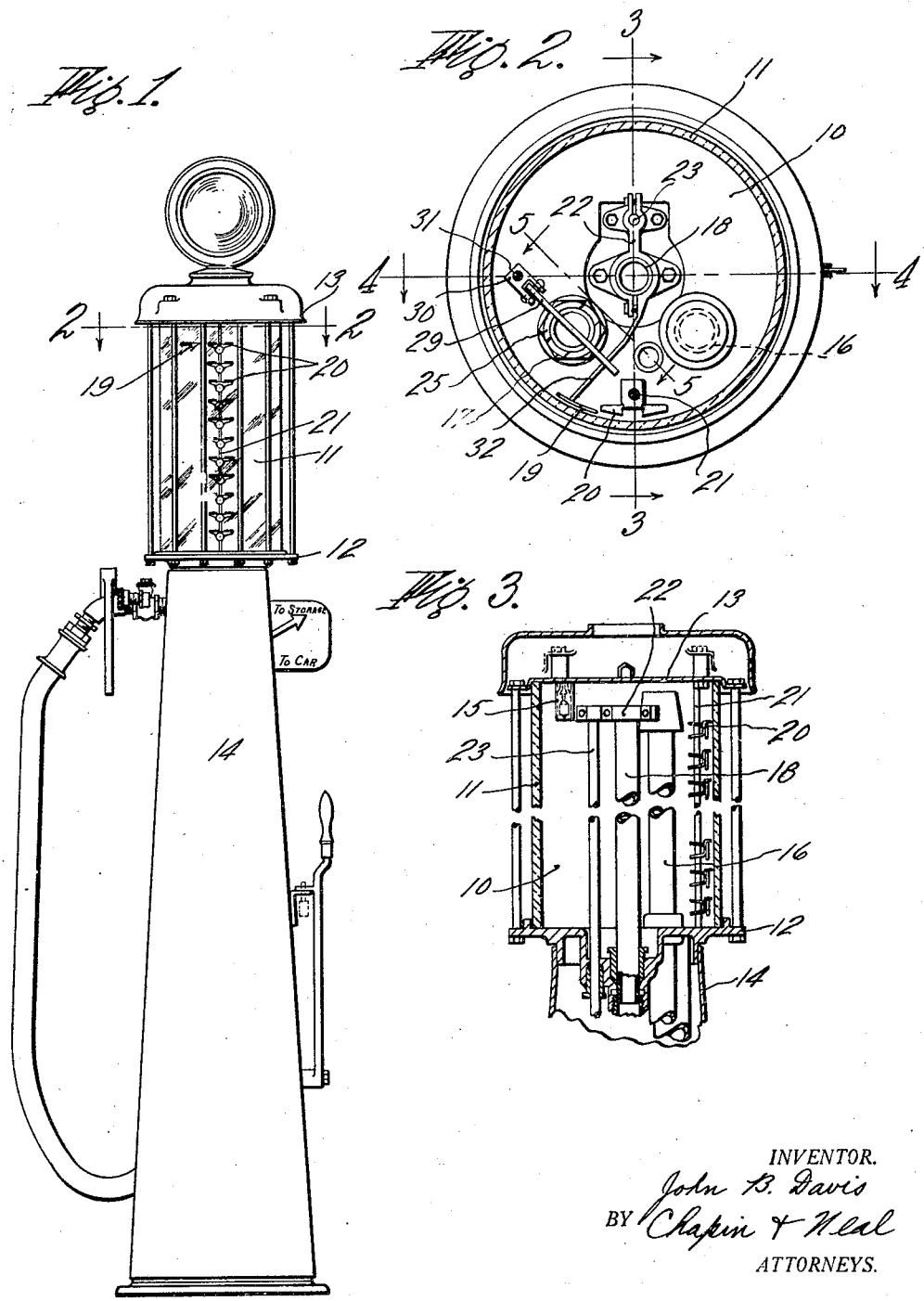
INVENTOR.
John B. Davis
BY Chapin & Neal
ATTORNEYS.

July 30, 1929.  J. B. DAVIS  1,722,694
LIQUID DISPENSING APPARATUS
Filed July 14, 1927  2 Sheets-Sheet 2
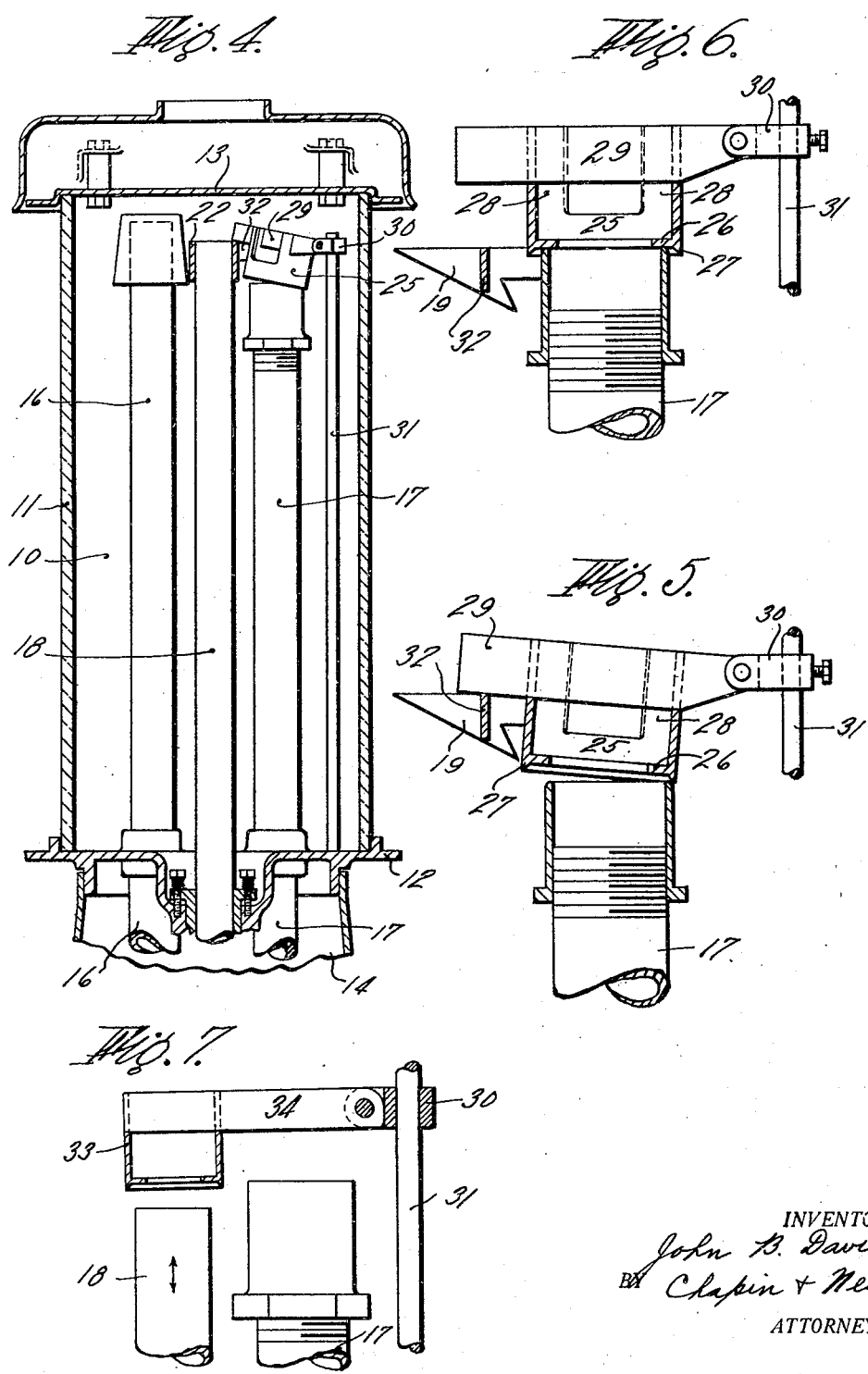
INVENTOR.
John B. Davis
BY Chapin + Neal
ATTORNEYS.

Patented July 30, 1929.

1,722,694

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF SPRINGFIELD, MASSACHUSETTS, A CORPORATION OF MASSACHUSETTS.

LIQUID-DISPENSING APPARATUS.

Application filed July 14, 1927. Serial No. 205,737.

This invention relates to improvements in liquid dispensing apparatus of the class commonly used for dispensing gasoline and the like.

Such apparatus commonly includes a measuring chamber, frequently a glass cylinder, to which the liquid is pumped or otherwise supplied. Extending upwardly into this cylinder is an overflow pipe which terminates at a predetermined level with an open upper end. Any excess liquid pumped into the measuring chamber drains off through the overflow pipe. The arrangement is such that, when the liquid level coincides with the level of the upper end of said pipe, a predetermined measured quantity is left in said receptacle. All of this quantity should be delivered to the customer and, if any part of it is diverted, the customer will be cheated.

Now it sometimes happens that the apparatus includes some movable part, which, during the operation of filling the measuring chamber, lies above the top of the overflow pipe and which, after the liquid has drained off to the level of the open upper end of the overflow pipe, is subsequently lowered into the liquid. If such part displaces any of the measured off liquid, the liquid thus displaced will flow into the overflow pipe, wherefore less than the quantity measured off will be delivered to the customer.

As an illustrative example, consider a dispensing apparatus of the type involving a slidable discharge pipe. Sometimes, one is required to attach to the upper end of the sliding discharge pipe an arrow which plays over a scale on the glass cylinder and indicates at all times the position of the open upper end of the discharge pipe. If this arrow is always entirely below the level of the receiving end of the overflow pipe no difficulty results. Then, however, liquid can enter the receiving end of the discharge pipe, during the filling operation, and interfere with the accuracy of the dispensing by causing more than the desired measured quantity to be dispensed. Therefore, it is common practice to slide the discharge pipe up, during the filling operation, until its receiving end lies high enough above the top of the overflow pipe so that no liquid can enter during the filling operation. This, however, means that the arrow lies entirely above the liquid when the latter is levelled off. Consequently, when the discharge pipe is later lowered to draw off a measured quantity, the arrow moves into the liquid, displacing some thereof and raising the level of liquid above the receiving end of the overflow pipe so that some of the measured quantity flows into the latter and is diverted from the customer.

This invention is directed to, and has for an object, the provision of means for overcoming the difficulty above set forth and for overcoming inaccuracy of measurement due to any moving part which enters the liquid after it has been levelled off and raises the level thereof.

In accomplishing this object, I make use of a device for temporarily extending the upper end of one of said pipes. Such device may be used in connection with the overflow pipe and, in this event, functions to extend the upper end of such pipe when the discharge pipe is lowered and before the arrow, or other liquid displacing element, enters the liquid. During the filling and levelling off operation, the extension is out of engagement with the overflow pipe to permit levelling off in the normal manner. It subsequently comes into play to raise the level of the receiving end of the overflow pipe to compensate for the raising of the liquid level by the movable liquid-displacing element. It may also be used to temporarily extend the receiving end of the sliding discharge pipe during the filling operation in order to avoid the necessity of running its receiving end above the level of the receiving end of the overflow pipe at that time. In this event, the arrow, or like element, will lie in the liquid at the time when it is levelled off so that the described inaccuracy of measurement will not occur.

The above and other objects will appear in the following description and will be particularly pointed out in the appended claims.

The invention will be disclosed with reference to the accompanying drawings, in which:—

Fig. 1 is an elevational view of a liquid dispensing apparatus embodying the invention;

Fig. 2 is a sectional plan view taken on the line 2—2 of Fig. 1;

Figs. 3 and 4 are sectional elevational views taken on the lines 3—3 and 4—4, respectively, of Fig. 2;

Fig. 5 is a fragmentary sectional view taken on the line 5—5 of Fig. 2 but drawn to a larger scale. This view shows the extension for the upper end of the overflow pipe in one of its two positions.

Fig. 6 is a view taken similarly to Fig. 5 and shows the extension in its other position; and Fig. 7 is a view showing the manner in which the extension can be applied to the discharge pipe.

Referring first to Figs. 3 and 4; 10 represents the measuring chamber of a liquid dispensing apparatus, herein shown as having a cylindrical glass wall 11 clamped between a base 12 and cap 13. The base 12 is usually supported upon the upper end of a casing 14, as shown in Fig. 1. The chamber 10 is vented in any suitable way, as by the vent valve 15 (Fig. 3), and liquid may be supplied to it in any suitable way by way of the supply pipe 16. An overflow pipe 17 extends through base 12 and upwardly into chamber 10 for the purpose of draining off all liquid above a predetermined level, which is defined by the level of the upper and open end of said pipe. A discharge pipe 18 is slidable vertically in chamber 10 from a position such as shown in Fig. 4, wherein its open upper end lies well above said predetermined level, downwardly to various other positions below such level. Thus, as the discharge pipe is lowered various measured quantities may be drawn off from the receptacle, such quantities being indicated by the arrow 19 which moves in close relation with a vertical series of quantity markers 20 mounted on a rod 21. The discharge pipe may be moved in any suitable way and by any suitable means. As shown in Figs. 2 and 3, it is connected at its upper end by a member 22 to the upper end of a rod 23 which is mounted to slide vertically in chamber 10 and passes downwardly through a suitable stuffing box in base 12. The lower end of rod 23 may be lifted by any suitable means and one such means is shown in my copending application Serial No. 160,743, filed January 12, 1927.

The extension for the upper end of the overflow pipe is best shown in Figs. 5 and 6. It consists of a short cylindrical sleeve 25. Preferably, the lower end of this sleeve has an inwardly turned flange 26 adapted to seat on the upper end of pipe 17 and below this flange a short sleeve 27, which is interiorly tapered so that when it drops down, as will later be described, it will easily find its way over the upper end of pipe 17. The sleeve 25 has oppositely disposed, upstanding, curved ears 28, integral therewith. A bar 29 fits into slots in said ears and is suitably fastened thereto, as by soldering. Bar 29 at one end, is pivoted to a support 30 fixed to a stationary vertical rod 31 in chamber 10. The other end of bar 29 lies in the path of movement of a brace 32 which connects the arrow 19 to the described member 22. When the discharge pipe 18 is raised to "fill" position,—i. e., far enough to carry its open upper end above the level of the upper end of the overflow pipe,—the brace 32 will engage bar 29 and lift sleeve 25 off the end of the overflow pipe into the position shown in Fig. 5. Thus, the latter is free to perform its normal function in the usual way. However, after the liquid has become levelled off in chamber 10 and the discharge pipe is lowered to draw off liquid therefrom, the brace 32, in descending, lowers bar 29 and allows sleeve 25 to seat itself on the upper end of the overflow pipe, as shown in Fig. 6. Sleeve 25 then forms an extension of the upper end of the same and prevents the liquid, which is displaced by arrow 19, brace 32, and member 22, from passing into the overflow pipe as it would otherwise do.

This same idea of temporarily extending the upper end of a pipe of a visible dispensing apparatus may also be applied in connection with the sliding discharge pipe and such an adaptation of the invention is shown in Fig. 7. Here a sleeve 33 similar to, but longer than sleeve 25 is supported at one end of a bar 34, which is pivoted at the other end to the support 30 but in such a manner that the bar can drop only slightly below the horizontal plane in which the receiving end of the overflow pipe is located. The sleeve is thereby held approximately in line with the discharge pipe and, when the latter is moved upwardly from any of its discharge positions to filling position, it will engage the sleeve 33 and lift it slightly until bar 34 lies horizontal. The upper end of discharge pipe 18 then lies in the same plane as the upper end of the overflow pipe 17. The arrow 19, as heretofore disclosed, does not extend above the upper end of the discharge pipe. Consequently, the arrow will be submerged in the liquid when the chamber 10 is filled and its subsequent movement will not cause liquid to be displaced into the overflow pipe, as in the case of the arrangement shown in Figs. 1 to 5. The sleeve 33 extends the upper end of the discharge pipe enough to prevent liquid from entering it during the operation of filling chamber 10. It also renders it unnecessary to run the discharge pipe up above the level of the upper end of the overflow pipe, as was heretofore necessary, and avoids the difficulty incident thereto, when an arrow or some other part, carried by the discharge pipe is lowered into the liquid after it has been levelled off.

The invention then provides two solutions for the aforesaid difficulty, viz, to temporarily extend the height of the overflow pipe to prevent the liquid displaced by the arrow from entering the overflow pipe or to provide a temporary extension for the upper end of the discharge pipe so that the arrow can at all times be submerged in the liquid and not cause any displacement of liquid into the overflow pipe. Each solution makes use of the same expedient, viz, a sleeve-like extension with means whereby it is automatically positioned to extend its pipe at the proper time.

The invention has been disclosed herein, in an embodiment at present preferred, for illustrative purposes but the scope of the invention is defined by the appended claims rather than by the foregoing description.

What I claim is:

1. In a liquid dispensing apparatus, a measuring chamber, a pipe extending into said chamber and terminating with an open upper end, a tubular member supported within said chamber and having open ends and arranged to engage the upper end of said pipe and form an extension thereof or to be separated therefrom, and means for effecting relative movement between said pipe and member to cause them to be engaged or separated.

2. In a liquid dispensing apparatus, a measuring chamber, an overflow pipe for withdrawing liquid therefrom above a predetermined level, a discharge pipe mounted to move in said chamber to permit the discharge of various measured quantities therefrom, a sleeve movable from one position in which it forms an extension of the upper end of the overflow pipe to another position in which it is separated therefrom, and means operable by movement of the discharge pipe above said level to move said sleeve from its first-named to its last-named position.

3. In a liquid dispensing apparatus, a measuring chamber, an overflow pipe for draining liquid from said chamber down to a predetermined level, a discharge pipe movable in said chamber from one position in which its receiving end lies above said level to various other positions in which said end lies below said level to permit the discharge of various measured quantities from said chamber, means for filling said chamber, said discharge pipe adapted to occupy said first named position during the filling operation, a member carried by the upper end of the discharge pipe and adapted to enter the liquid after it has been drawn off down to said level as the discharge pipe is lowered below said level, and means for preventing the liquid displaced by said member from entering said overflow pipe.

4. In a liquid dispensing apparatus, a measuring chamber, an overflow pipe for draining liquid from said chamber down to a predetermined level, a discharge pipe movable in said chamber from one position in which its receiving end lies above said level to various other positions in which said end lies below said level to permit the discharge of various measured quantities from said chamber, means for filling said chamber, said discharge pipe adapted to occupy said first named position during the filling operation, a member carried by the upper end of the discharge pipe and adapted to enter the liquid after it has been drawn off down to said level as the discharge pipe is lowered below said level, and means operable by movement of said discharge pipe downwardly from the first named position to extend the upper end of said overflow pipe before said member enters the levelled-off liquid in said chamber.

5. In a liquid dispensing apparatus, a measuring chamber, an overflow pipe adapted to withdraw liquid therefrom above a predetermined level, a discharge pipe movable from said level to various lower levels to permit the discharge of various measured quantities, and a tubular member supported within said chamber and having open ends and arranged to be engaged with or separated from the upper end of one of said pipes and when so engaged to form an extension of its pipe, and means for moving said discharge pipe, the movement of said discharge pipe causing the aforesaid engagement or separation of said member.

In testimony whereof I have affixed my signature.

JOHN B. DAVIS.